US012710511B1

(12) United States Patent
McMichael et al.

(10) Patent No.: US 12,710,511 B1
(45) Date of Patent: Aug. 18, 2026

(54) STRAY LIGHT REDUCTION IN SENSORS

(71) Applicant: Zoox, Inc., Foster City, CA (US)

(72) Inventors: Ryan McMichael, Mountain View, CA (US); Robert Nicholas Moor, San Mateo, CA (US); Subasingha Shaminda Subasingha, San Ramon, CA (US); Joseph Patrick Warga, San Francisco, CA (US); Harrison Thomas Waschura, Los Altos Hills, CA (US)

(73) Assignee: Zoox, Inc., Foster City, CA (US)

( * ) Notice: Subject to any disclaimer, the term of this patent is extended or adjusted under 35 U.S.C. 154(b) by 784 days.

(21) Appl. No.: 17/364,526

(22) Filed: Jun. 30, 2021

(51) Int. Cl.

| | |
|---|---|
| ***G01S 7/481*** | (2006.01) |
| ***G01S 7/48*** | (2006.01) |
| ***G01S 17/10*** | (2020.01) |
| ***G01S 17/931*** | (2020.01) |

(52) U.S. Cl.
CPC ............ *G01S 7/481* (2013.01); *G01S 7/4802* (2013.01); *G01S 17/10* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 10,960,900 | B1 * | 3/2021 | Crouch | G01S 7/4808 |
| 2015/0253428 | A1 * | 9/2015 | Holz | G01S 7/483 356/5.01 |
| 2020/0142075 | A1 * | 5/2020 | Lee | G05D 1/0088 |
| 2020/0158835 | A1 * | 5/2020 | Yu | G01S 17/89 |
| 2020/0209398 | A1 * | 7/2020 | Kempf | H04N 13/254 |
| 2021/0109215 | A1 * | 4/2021 | Schmitz | G01S 17/931 |

* cited by examiner

*Primary Examiner* — Abby J Flynn
*Assistant Examiner* — Bakari Underwood
(74) *Attorney, Agent, or Firm* — Lee & Hayes, P.C.

(57) ABSTRACT

Techniques for reducing stray light or glare in sensor data are discussed herein. The sensor data can be captured by a sensor, and the sensor data can be based on laser pulses emitted from emitters associated with a first polarization and received by the sensor associated with a second polarization. A difference between the first polarization and the second polarization can be used to filter out or reduce stray light from the sensor and sensor data. The sensor data can be utilized to determine distance data associated with an object. The sensor data and the first polarization and second polarization can also be utilized to determine characteristics of the object.

20 Claims, 5 Drawing Sheets

300

400
402
408
406
410
412
414
416
418
420
422

STRAY LIGHT REDUCTION IN SENSORS

BACKGROUND

Sensors, such as time-of-flight (ToF) sensors, may be unreliable in certain environments, including environments in which objects have high reflectivity. Moreover, because ToF sensors are often designed to detect objects in predetermined distance ranges, environments that include multiple objects at different distances may be difficult to interpret, e.g., due to ambiguity in the sensor returns. Such shortcomings may result in unreliable data, increased processing time to better understand the data, and/or decreased efficiency in identifying and/or characterizing objects that may be potential obstacles to safe travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
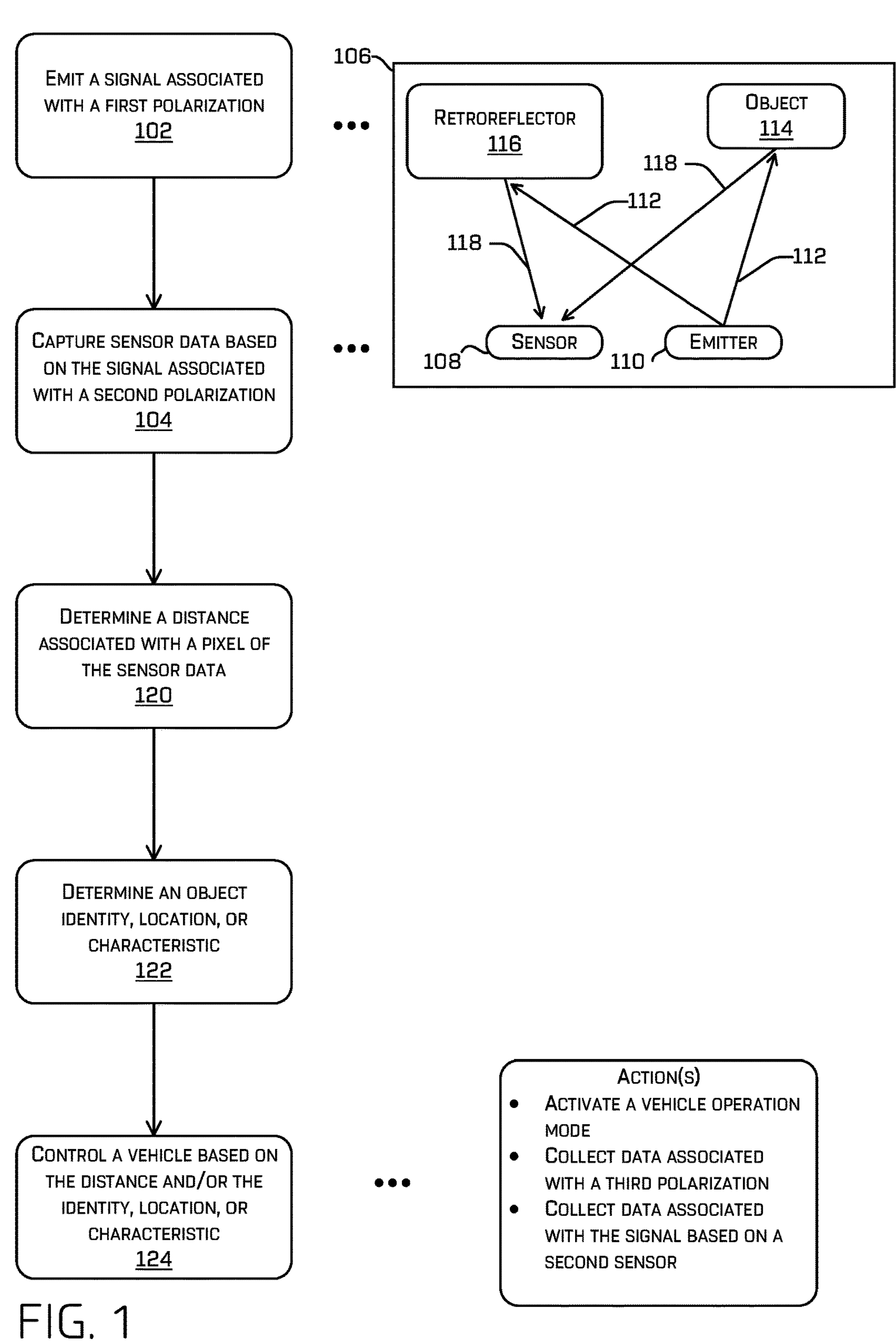
FIG. 1 is a pictorial flow diagram of an example process for controlling an amount of light reaching a sensor, in accordance with examples of the disclosure.

Techniques for reducing stray light or glare in sensor data are discussed herein. In some examples, such glare may be caused by a retroreflector, such as a stop sign, and may be captured by a time-of-flight sensor of a vehicle. Sensor data can include data associated with an environment where multiple objects (e.g., pedestrians, vehicles, bicyclists, etc.) are located. In some examples, a time of flight (ToF) sensor can include an emitter that outputs laser light to be captured by a sensor to determine distance data between the sensor and an object in an environment. The ToF sensor may emit laser pulses from the emitter associated with a first polarization and received by a sensor associated with a second polarization. The first polarization and the second polarization may be sufficiently different from each other such light reflected from a relatively highly reflective object, for example, a retroreflector, may be attenuated reducing a required dynamic range of the sensor to detect both objects with a relatively high reflectivity and objects with a relatively low reflectivity. The techniques described herein may, in some instances, result in a better understanding of the environment of the vehicle, thereby leading to safer and/or more confident controlling of the vehicle.

As discussed herein, sensor data can be captured by one or more sensors integrated within, or separate from, a computing device of the vehicle. The one or more sensors can include depth sensors, ToF sensors, RADAR sensors, LIDAR sensors, SONAR sensors, image sensors, microphones, or any combination thereof. The computing device can include an emitter to emit a signal via a transmit path associated with a first polarization and a sensor to sense a return signal from the environment via a receive path associated with a second polarization. Further, the computing device can comprise a sensor computing device to determine a distance, a characteristic, and/or a reflective intensity of an object in the environment based on the captured sensor data.

In the context of a ToF sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can be associated with the pixels (e.g., an intensity and depth value for each pixel) in the sensor data. The computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, sensor data based on laser pulses emitted by an emitter in a ToF sensor can be captured by one or more sensors in the ToF sensor. For example, the emitter can include multiple emitters that emit the laser pulses and may be associated with a first polarization. The sensor data received by the sensor may be associated with a second polarization and can be utilized to determine distance data associated with the environment. A difference between the first polarization and the second polarization may attenuate an amount of light received by the sensor reflected from an object with a relatively high reflectivity, for example, a retroreflector, a mirror, glass, water, among others when compared to an amount of light received by the sensor reflected from an object with a relatively low reflectivity or diffuse surface, for example, a Lambertian surface. In examples, the attenuation of the light received reflecting from the object with a relatively high reflectivity allows a reduction in the dynamic range required of the sensor when collecting data representative of objects in an environment with both reflective and diffusive surfaces. By reducing the required dynamic range of the sensor, more accurate data may be determined. For example, detecting a range to an object of interest may be difficult if the object is washed out due to an intense signal associated with a highly reflective object that saturates the sensor or causes the dynamic range of the sensors to be extended towards the sensor's limit. This may cause the data associated with the object of interest to be more difficult to resolve from a background or other object.

In some examples, once distances to objects of the environment are determined, the computing device of the vehicle may determine one or more trajectories for proceeding relative to the object(s). In some instances, depth and/or intensity information generated according to techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a single, configurable sensor, to more accurately determine features of the objects. By capturing image data at different sensor configurations, depth data can be disambiguated. For example, techniques described herein may be faster and/or more robust than conventional techniques, as they may increase the reliability of depth and/or intensity information, alleviating the need for successive images. That is, techniques described herein provide a technological improvement over existing object detection, classification, prediction and/or navigation technology. In addition to improving the accuracy with which sensor data can be used to determine objects and correctly characterize motion of those objects, techniques described herein can provide a smoother ride and improve safety outcomes by, for example, more accurately providing safe passage to an intended destination.

The techniques described herein can be implemented in a number of ways. Example implementations are provided below with reference to the following figures. Although applicable to vehicles, the methods, apparatuses, and systems described herein can be applied to a variety of systems and are not limited to vehicles. In another example, the techniques can be utilized in an aviation or nautical context, or in any system configure to input data to determine depth data associated with objects in an environment. Additionally, the techniques described herein can be used with real data (e.g., captured using sensor(s)), simulated data (e.g., generated by a simulator), or any combination of the two.

Figure 2:
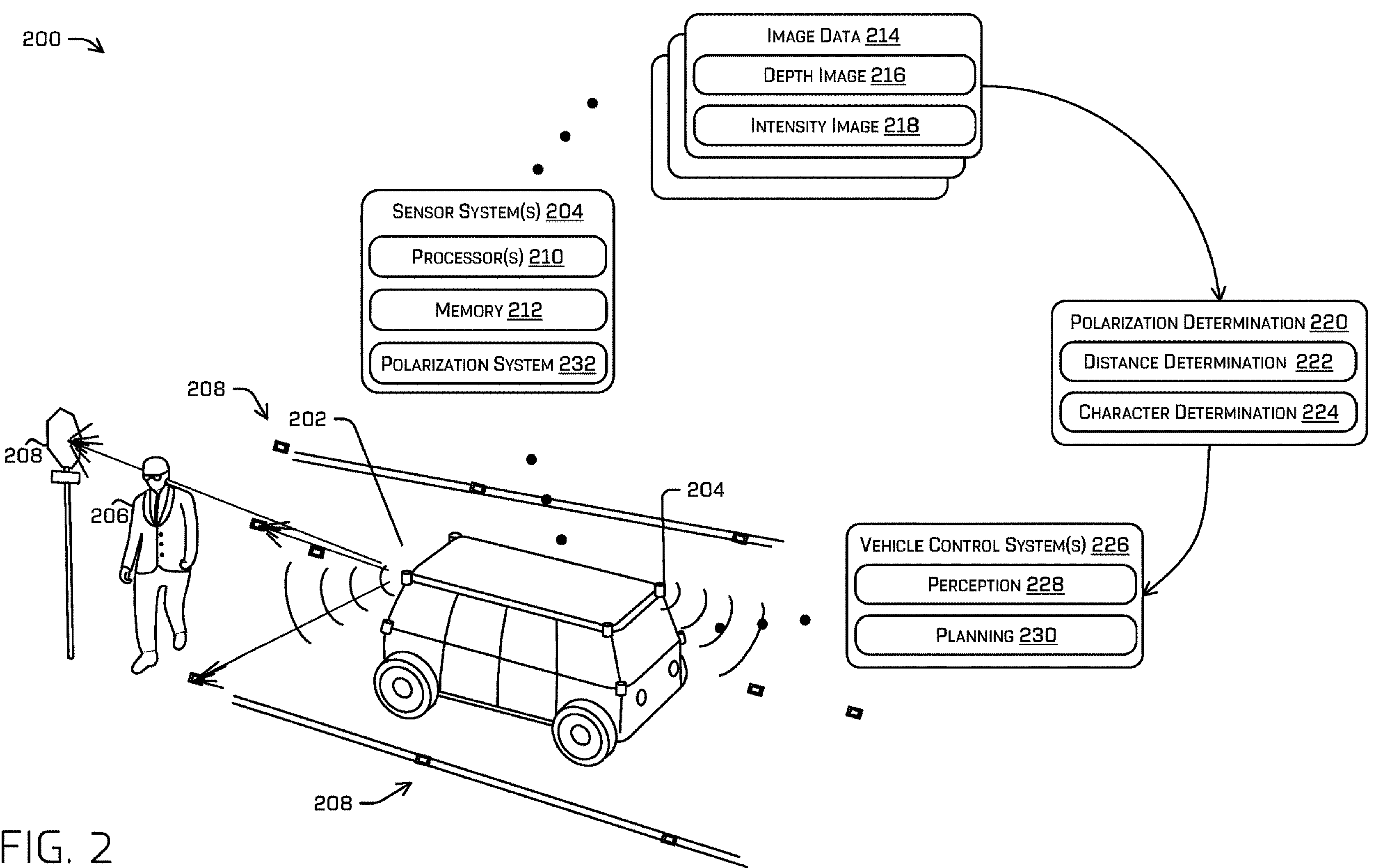
FIG. 2 illustrates an example environment and components of a vehicle, in accordance with examples of the disclosure.

FIG. 1 is a pictorial flow diagram of an example process for controlling an amount of light reaching a sensor, for example, a time of flight sensor. For example, process 100 can be implemented using components and systems illustrated in FIG. 2 and described below, although the process 100 is not limited to being performed by such components and systems. Moreover, the components and systems of FIG. 2 are not limited to performing the process 100.

In more detail, the process 100 can include an operation 102 that includes emitting a signal associated with a first polarization, and at operation 104 capturing sensor data (e.g., sensor data) based on an emitter. As noted above, techniques described herein may be particularly applicable for use with time-of-flight (ToF) sensors, and the example of FIG. 1 may use ToF sensors as one specific example. The disclosure is not limited to use with ToF sensors, as techniques described herein may be applicable to other types of sensors that may be adversely affected by stray light. In some examples, the sensor data can be utilized by the ToF sensor to measure both distance data and intensity data.

An example 106 illustrates an environment including a sensor 108 that captures first sensor data based on a first emitter (e.g., an emitter 110). In examples, the emitter 110 emits a first signal via a transmit path 112 towards objects in the environment, for example, object 114 and retroreflector 116. In examples the first signal may be reflected off of the objects creating a second signal. In examples the second signal is received via a receive path 118 by the sensor 108. In examples, the first sensor is associated with a first polarization. Additionally or alternatively, the second signal is associated with a second polarization. In examples, the first polarization and the second polarization are different.

In some examples, the first polarization is associated with a first polarizer in the transmit path 112, and the second polarization is associated with a second polarizer in the receive path 118. In some examples, the first polarizer and/or second polarizer may include a filter. For example, the filter associated with the first polarization may limit the portion of the signal associated with the first polarization to pass through the filter. In examples, the filter associated with the second polarization may limit the portion of the signal associated with the second polarization to pass.

Additionally or alternatively, the first polarizer may include a vertical cavity surface emitting laser (VSCEL) configured to generate a polarized signal. In examples, the first polarizer includes a light emitting diode (LED), a light amplification by stimulated emission of radiation (laser), or combinations thereof and/or any other source of polarized light. Additionally or alternatively, in some examples, the first polarizer may include a beam splitter where the signal from the emitter is separated into substantially orthogonally polarized signals (e.g., signal 1 with polarization 1 and signal 2 with polarization 2), one of the orthogonally polarized signals is converted to be substantially similar to the other polarized signal (e.g., signal 2 with polarization 2 is converted to signal 2 with polarization 1), the signals are rejoined with substantially similar polarizations (e.g., signal 1 with polarization 1 is joined with signal 2 with polarization 2 creating joined signal with polarization 1). In examples, the joined signal with polarization 1 may be used as the first signal and emitted via transmit path 112 as discussed elsewhere in this application. In examples, the polarization of one of the signals may be converted using a series of filters to convert the polarization (e.g., polarization 2 to polarization 1). In examples, the splitting and converting of the signal may cause the two signals to become out of sync. In those instances, the difference may be compensated by passing the non-converted signal through a filter to slow the signal and/or reflected through a longer path.

Additionally or alternatively, one or both of the signals may be converted. In examples, the signals may be converted to a common polarization. For example, the signal may be split into signal A with polarization A and signal B with polarization B. Signal A with polarization A may be converted to polarization AB and signal B may be converted to polarization AB. For illustrative purposes, if signal A is polarized at 90 degrees while signal B is polarized at zero degrees, then signals A and B may be converted to a common polarization at 45 degrees. In examples, the splitting and transformation of both signals, may limit the amount of the signals fall out of sync.

Additionally or alternatively, first polarizer may include a filter using polarization techniques. In examples, the filter may use polarization based on scattering, polarization based on reflection, polarization based on birefringence, or combinations thereof. In some examples, such a first polarizer may be mechanically, electrically, and/or electromechanically actuated such that polarization may be turned on or off and/or a polarization angle may be adjusted.

The sensor 108 and the emitter 110 can be included in a same sensor pod of the ToF sensor. However, the sensor 108 and the emitter 110 are not limited to being in the same sensor pod, as techniques described herein may be applicable to other arrangements of emitters and sensors (e.g., emitters in different sensor pods, emitters in non-sensor pod arrangements, etc.).

Returning to operation 104, the first sensor data can be captured by the sensor 108 based on light emitted by the emitter 110. For example, the first sensor data can be captured by the sensor 108 based on one or more laser light pulses (e.g., a laser pulse) emitted by the emitter 110. The laser pulse can be emitted by the emitter 110 into an environment (e.g., an area in a “field of view” of the ToF sensor, a portion of an area surrounding the ToF sensor, and/or a nearby area of the ToF sensor, etc.).

The first sensor data can be associated with light received by the sensor 108 based on the light emitted by the emitter 110. For example, the light can be received, as received light, based on the light emitted by the emitter 110 being reflected by one or more objects in the environment. The one or more objects can include an object 114 and a retroreflector 116. However, the received light is not limited to light received from the object 114 and the retroreflector 116 and can include light received from other object(s). In some cases, the received light can include light that is transmitted by the emitter 110, reflected off the object 114, and received by the sensor 108, as first light, and can include light that is transmitted by the emitter 110, reflected off the retroreflector 116, and received by the sensor 108, as second light.

In some examples, the sensor 108 can receive the first light as well as the second light, which can be associated with the light reflected off the retroreflector 116 due to highly reflective properties of the retroreflector 116. Because the first light and the second light are received by the sensor 108, the first sensor data captured by the sensor 108 can include data associated with the first light and data associated with the second light. In this example, the distance data can be determined for a first pixel of the first sensor data.

In some examples, the second light, reflected from the retroreflector 116 maintains a strong polarization component consistent with the first polarization associated with the emitted signal. In examples, the type of retroreflector or reflective surface may affect this effect. For example, a spherical retroreflector may maintain a higher polarization component when compared to a cubic retroreflector. Similarly, the cubic retroreflector may maintain a higher polarization component when compared to a reflective surface. Additionally or alternatively, an orientation of the retroreflector and/or reflective surface may also impact the strength of the polarization. For example, if the reflective surface or the cubic retroreflector is constructively aligned with the first polarization, then the reflection from the reflective surface or the cubic retroreflector may maintain a higher polarization component similar to the spherical retroreflector. Similarly, if the reflective surface or the cubic retroreflector is not constructively aligned with the first polarization, then the reflection from the reflective surface or the cubic retroreflector may have a reduced polarization component when compared to the spherical retroreflector.

In some examples, the first light, reflected off of the object 114, includes light reflected from the object 114 does not retain a strong polarization component consistent with the first polarization associated with the emitted signal. For example, often the object 114 has a relatively low reflectivity or more diffuse surface, for example, a Lambertian surface when compared to the retroreflector 116 or highly reflective surface. In this example, the object 114 diffuses and scatters a portion of the first signal such that the first light received at the sensor has a reduced polarization component when compared to the second light.

In some examples, a polarizer may be used as part of or in conjunction with the sensor 108. For example, the polarizer, may be configured to allow light associated with the second polarization to be measured by sensor 108. For example, the polarizer may include a polarizing filter associated with the second polarization and allow components of the first light and the second light aligned with the second polarization to reach sensor 108. In this example, the polarizing filter reduces an intensity of the first light and the second light by reducing and/or rejecting components of the light that are not aligned with the second polarization but allows components of the light that are aligned. In this example, what otherwise may be an overpowering signal contained in the second light, is attenuated to be closer in power and/or intensity to the signal contained in the first light.

At operation 120, the process 100 can include determining a distance or metric associated with a pixel of the sensor data. For example, information contained in the first light and/or second light may be processed and resolved into a distance from the sensor 108, the emitter 110, and/or an object, for example, a vehicle, containing one or more of the sensor 108 or the emitter 110.

In examples, the process 100 at operation 120 can include determining a first metric (e.g., a first distance) for a first pixel associated with the first light and a second metric (e.g., a second distance) for a second pixel associated with the second light. For example, the first metric can be associated with distance data associated with the first pixel location; and the second metric can be associated with the second pixel location. The first metric can include a product of an intensity value at the first pixel location, a depth value associated with the first pixel location, and/or a value based at least in part on a phase angle associated with the first pixel location. The second metric can be similar to (or the same as) as the first metric, except based on the information contained in the second light instead of the first light.

In some cases, the information associated with the first light can be utilized to determine the first distance. For example, the first distance can be associated with a distance to the object 114. In some cases, the information associated with the second light can be utilized to determine the second distance. For example, the second distance can be associated with a distance to the retroreflector 116.

At operation 122, the process 100 can include determining an object identity, a location, or a characteristic based, at least in part, on the first metric and the second metric. For example, the determined distance, intensity, and/phase angle associated with the received light may be used and/or combined with other information, for example, information associated with adjacent, near, or distal pixels, or environmental information, to determine an object identity, a location, or a characteristic. For example, the information associated with the first light may be used to determine a location and identity of the object 114. In examples, the object 114 may be determined to be a vehicle, a pedestrian, or another object found in an environment. In examples, the retroreflector 116 may be determined to be a retroflector.

While techniques as discussed above are oriented toward first and second pixels, they are not limited as such. In some examples, sensor data associated with regions of pixels of image data can be compared instead of sensor data associated with pixels. Sensor data associated with a first region can be compared to sensor data associated with a second region. The regions can be separate regions or overlapping regions. By the comparing sensor data associated with the first and second regions, motion blur can be reduced and/or eliminated.

At operation 124, the process 100 can include controlling a vehicle based on the distance, object identity, location, or characteristic. The vehicle can include the ToF sensor, including the sensor 108, the emitter 110, and the emitter 110. In some examples, one or more actions based on the distance, object identity, location, or characteristic can be determined, the action(s) including activating a vehicle operation mode, collecting data associated with a third polarization, or collecting data associated with the signal based on a second sensor. The vehicle can be controlled based on the activated vehicle operation mode, collected data associated with a third polarization, or collected data associated with the signal based on a second sensor. However, controlling the vehicle is not limited to those actions, and the vehicle can be controlled based on other actions.

FIG. 2 illustrates an example environment and components of a vehicle, in accordance with examples of the disclosure. The example vehicle 202 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 202 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 202 can be any configuration of vehicle, such as, for example, a van, a sport utility vehicle, a cross-over vehicle, a truck, a bus, an agricultural vehicle, and/or a construction vehicle. The vehicle 202 can be powered by one or more internal combustion engines, one or more electric motors, hydrogen power, any combination thereof, and/or any other suitable power source(s). Although the example vehicle 202 has four wheels, the systems and methods described herein can be incorporated into vehicles having fewer or a greater number of wheels, tires, and/or tracks. The example vehicle 202 can have four-wheel steering and can operate generally with equal performance characteristics in all directions. For instance, the vehicle 202 may be configured such that a first longitudinal end of the vehicle 202 is the front end of the vehicle 202, and an opposite, second longitudinal end of the vehicle 202 is the rear end when traveling in a first direction, and such that the first end becomes the rear end of the vehicle 202 and the second end of the vehicle 202 becomes the front end of the vehicle 202 when traveling in the opposite direction. Stated differently, the vehicle 202 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 202 can be used to travel through an environment and collect data. For example, the vehicle 202 can include one or more sensor systems 204. The sensor system(s) 204 can be, for example, one or more time-of-flight (ToF) sensors, LiDAR sensors, RADAR sensors, SONAR sensors, image sensors, audio sensors, infrared sensors, location sensors, etc., or any combination thereof. Certain implementations described herein may be particularly well-suited for use with ToF sensors, although other types of sensors also are contemplated. The sensor system(s) 204 may be disposed to capture sensor data associated with the environment. For example, the sensor data may be processed by a vehicle control system to identify and/or classify one or more objects in the environment, e.g., trees, vehicles, pedestrians, buildings, road surfaces, signage, barriers, road marking, or the like and/or to navigate the vehicle 202 relative to such object(s). In some examples, the object(s) can include a pedestrian (e.g., an object 206) and a road sign (e.g., a stop sign (e.g., a retroreflector 208)).

As also illustrated in FIG. 2, the sensor system(s) 204 can include one or more processors 210 and memory 212 communicatively coupled to the processor(s) 210. The memory 212 can store processor-executable by the processor(s) 210 to cause the sensor system(s) 204 to perform functions that reduce glare or stray light and sensor/image data and/or correct the data to remove the impact of the glare or stray light, as detailed herein. The processor(s) 210 and/or the memory 212 may be physically integrated into the sensor system(s), e.g., as an SoC, FPGA, ASIC, or the like, or, in some implementations, the processor(s) 210 and/or the memory 212 may be available to, e.g., connected to receive signals from and/or send signals to, the sensor system(s) 204. As discussed above, the sensor system(s) 204 can determine the sensor data in various formats (e.g., a quadrature format, an intensity and depth format, and/or an unprojected format) using the processor(s) 210.

In the example of FIG. 2, the sensor system(s) 204 may include a ToF sensor, which may be configured to emit a carrier (e.g., a signal) and receive, e.g., capture, a response carrier (e.g., a response signal) comprising the carrier reflected off a surface in the environment. The ToF sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

In the example of FIG. 2, the sensor system(s) 204 may include a polarization system 232, which may be configured to polarize a signal emitted from a sensor. For example, the polarization system 232 may include a filter to limit the emitted signal to a polarization. In examples, the filter is configured to change the polarization by electronically and/or mechanically rotating the filter. In examples, the polarization system 232 may be configured to limit a received signal to a polarization. In examples, the polarization system 232 includes a filter that removes or reduces portions of a return signal that do not align with the polarization of the filter. In examples, the filter is configured to change the polarization by electronically and/or mechanically rotating the filter. In various examples, such polarization may be turned on or off.

As also illustrated in FIG. 2, the sensor system(s) 204 may be configured to output the sensor data, e.g., the intensity and depth information, the quadrature values, or the like, as image data 214. The image data 214 may be embodied as image frames. The image data 214 can include a stream of serially-generated (e.g., at a predetermined interval) image frames. Generally, each of the frames may include the same type of data, e.g., data related to the intensity and depth for each of a plurality of pixels comprising the receiver of the sensor. As illustrated in FIG. 2, the image data 214 can include a depth image 216 and an intensity image 218 generated by the sensor system(s) 204 and representative of a portion of the environment 200. Similarly, other instances, e.g., frames, of the image data 214 can include an intensity image and/or a depth image representative of the environment 200 at the corresponding sensing time.

As noted above, objects in the environment 200 may have different reflectively, and some highly reflective objects, e.g., retroreflectors (e.g., the retroreflector 208), can result in stray light entering a sensor or glare in the image data 214. Moreover, some less-reflective objects that are close to the sensor system(s) 204 can also result in stray light entering the system and may result in image glare, image saturation, and/or image dynamic range exceeding a threshold, where for the example, when below the threshold, the system may accurately identify an object 206. In examples, stray light or glare may impact more than just the pixels associated with the highly reflective object. Techniques described herein can correct for stray light or glare by reducing the stray light captured by or transmitted to a sensor. For example, the light received by the sensor system 204 may be controlled using the techniques described herein to better represent the environment and/or may have a higher associated confidence.

As illustrated in FIG. 2, a polarization determination system 220 may be configured to receive the image data 214 generated by the sensor system(s) 204. In more detail, the polarization determination system 220 can include a distance determination component 222 and a character determination component 224. For clarity, the polarization determination system 220 (and its components) are illustrated separate from the sensor system(s) 204 and from one or more vehicle control system(s) 226. However, portions of the polarization determination system 220 may be implemented on one or both of the sensor system(s) 204 and/or the vehicle control system(s) 226. By way of non-limiting example, the processor(s) 210 may be configured to execute actions associated with the distance determination component 222 and/or the character determination component 224. Additionally or alternatively, in examples, the polarization determination system 220 or components thereof may be incorporated into the perception system 228 among other systems or remain separate therefrom.

The distance determination component 222 may be configured to determine a distance based on received light associated with sensor data based on an emitter. Based on the received light, the distance determination component 222 can determine distances for one or more pixels of the sensor data. The distances can include a first distance for a first pixel of the sensor data associated with a first light and a second distance for a second pixel of the sensor data associated with a second light. In some cases, the sensor data associated with the first light be utilized to determine the first distance. For example, the first distance can be associated with a distance to an object in the environment, for example, object 114 or object 206. In some cases, the sensor data determined based on the received light associated with the second light can be utilized to determine the second distance. For example, the second distance can be associated with a distance to the object in the environment, for example, retroreflector 116 or retroreflector 208.

The character determination component 224 can be configured to determine an object identity, location, or characteristic. For example, the distance associated with an object as well as the location of the pixel within an image can be used to determine a location in the environment. Additionally or alternatively, the distance associated with the object as well as information associated with other pixels in the image can be used to identify an object. For example, the object may be identified as a vehicle, a pedestrian, a retroreflector, a sign, a curb, a plant, a pole, a body of water, a surface, or other objects found in an environment. Additionally or alternatively, the distance associated with the object as well as information associated with other pixels in the image can be used to determine a characteristic of the object or the environment. For example, the pixel information may be used to determine that the environment or a portion of the environment is wet, for example, a road surface. In examples, the system is configured to determine a polarization associated with a reflected signal. For example, the system may change a polarization associated with the sensor. In examples, one or more signals received via a receive path may pass through one or more polarization filters associated with different polarizations. For example, a signal reflected from an object associated with a reflected polarization may pass through a polarization filter associated with a sensor generating a first signal associated with a first polarization orientation. In this example, the polarization filter may be rotated to a second polarization orientation, and may pass a second signal associated with the reflected polarization through the polarization filter associated with the sensor generating a second signal. In examples, characteristics of the first and second signals may be compared, for example, a depth and/or an intensity, to determine an angle of the reflected polarization. In examples, the context of an environment, the angle of the reflected polarization may be used to determine a characteristic of the object. In examples, the object may be a surface for example, a road, a wall, a body of water among others.

Additionally or alternatively, the first signal associated with the reflected polarization may be received by a second polarization filter associated with a second sensor. In this example, the first signal may pass through second polarization filter generating a third signal associated with a third polarization orientation. In this example, the first signal and the third signal may be compared to determine the angle of the reflected polarization.

Additionally or alternatively, in examples, the polarization filters of the first and/or second sensors may be rotated to a polarization angle based on a predetermined progression or pattern, and/or the comparison of the first and second signals and/or the comparison between the first and third signals, or combinations thereof. For example, the system may select a second polarization angle based on a progression of increasing by an angular increment. In examples, the system may select a second polarization angle based on a pattern of increasing and decreasing the angle based on varying angular increments. In examples, the system my use the comparison of the signals to select the next polarization. For example, the system may determine that the second signal has a lower intensity than the first signal. In this example, the system may select the next angle to be closer to an angle of the first signal than to an angle associated with the second signal. Additionally or alternatively, the process may be repeated until a confidence of determining the characteristic exceeds a desired threshold. Additionally or alternatively, the pixel information may be used to determine that an object in the environment is static, moving, accelerating, and/or decelerating. Of course, though described with respect to rotating the polarizations of the filters above, such polarization filters may be fixed in various additional or alternative examples.

As also illustrated in FIG. 2, the character determination component 224 may be transmitted to the vehicle control system(s) 226, e.g., for use in controlling the vehicle 202. By way of non-limiting example, the vehicle control system(s) 226 can include a perception system 228 and a planning system 230. In examples, the perception system 228 may receive data from the character determination component 224 and perform one or more of object detection, segmentation, and/or classification to determine objects in the data. The planning system 230 may determine a trajectory or route for the vehicle 202, e.g., relative to objects perceived by the perception system 228 based on the data received from character determination component 224. As described herein, providing the vehicle control system(s) 226 with the data from the character determination component 224 can improve safety outcomes, e.g., relative to providing the vehicle control system(s) 226 with the image data 214 impacted by stray light and/or glare.

Figure 3:
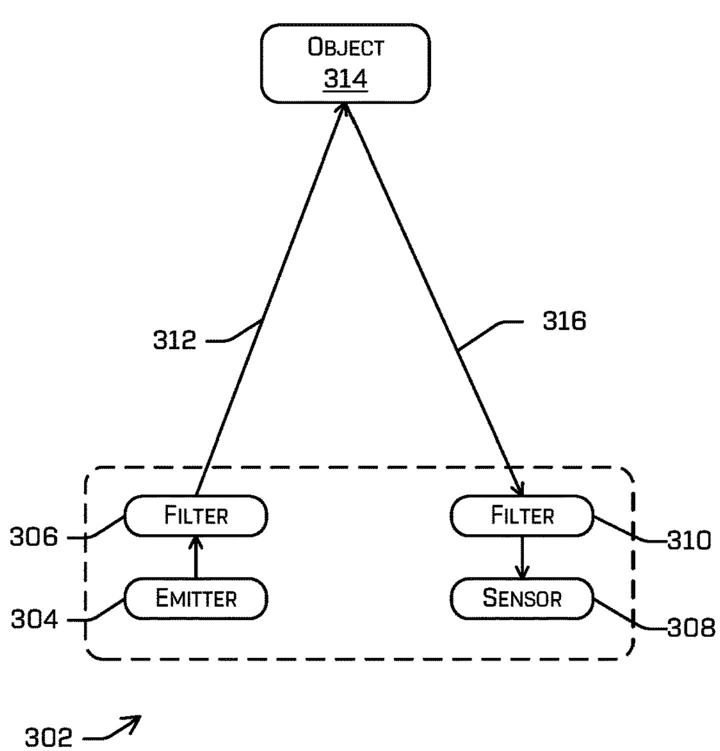
FIG. 3 illustrates example environment with a sensing system, in accordance with examples of the disclosure.

FIG. 3 illustrates example environment with a sensing system 302. In examples, the sensing system 302 includes an emitter 304, a first filter 306, a sensor 308, and a second filter 310. In examples, a signal emitted from the emitter 304 may pass through the first filter 306 along a transmit path 312. In examples, the first filter 306 includes a polarization filter imparting a first polarization on the signal emitted from the emitter 304. In this example, the signal having a first polarization travels along the transmit path 312 until encountering an object 314. In examples, the signal having the first polarization is reflected off of a surface or the object 314 and travels along a receive path 316 towards the sensing system 302. In examples, the object 314 may reflect a large portion of the signal maintaining the first polarization having a relatively large intensity or may reflect the signal having a relatively low intensity. In examples, the reflected signal includes components of the signal in the first polarization as well as components of the signal not aligned with the first polarization. This may be due to the reflectivity or diffusivity of a surface of the object 314, the diffusivity of the environment through which the signal travels, and/or ability of the first filter 306 to fully polarize the signal.

Additionally or alternatively, the reflected signal traveling along the receive path 316 may pass through the second filter 310. In examples, the second filter 310 may limit portions of the signal associated with a second polarization to pass through to sensor 308. In examples, the first polarization and second polarization may be the same or different polarizations. In examples, the second polarization is different from the first polarization. In this example, the signal received by the sensor 308 may have a lower intensity than the signal when emitted and/or traveled along the transmit path 312. For example, the signal traveling along the transmit path 312 having a first polarization may have a first intensity.

In examples, where the object 314 has a relatively diffuse surface, the signal reflected by the object 314 may contain a relatively small amount of the transmitted signal and, in some cases, not preserve much of the first polarization. In this example, the signal traveling along the receive path 316 has a second intensity that is much lower when compared to the first intensity since a portion of the signal was not reflected off of the object 314. The reflected signal traveling along the receive path 316 passes through the second filter 310, having a third intensity, where portions of the signal not associated with the second polarization are kept from passing to the sensor 308. In this example, the second filter removes a relatively small amount of the signal, since the signal passing through the second filter 310 had a relatively even polarization.

However, in examples where the object 314 is relatively reflective, for example, a shiny surface or a retroreflector, the signal reflected by the object 314 may contain a relatively large amount of the transmitted signal and, in some cases, preserve most, or a large amount of the first polarization. In this example, the signal traveling along the receive path 316 has a fourth intensity that is similar to the first intensity since a large portion of the signal was reflected off of the object 314. The reflected signal traveling along the receive path 316 passes through the second filter 310, having a fifth intensity, where portions of the signal not associated with the second polarization are kept from passing to the sensor 308. In this example, the second filter removes a relatively large amount of the signal, since the signal passing through the second filter 310 had a relatively large polarization component associated with the first polarization and a relatively low polarization component associated with the second polarization. In this example, the fifth intensity may be much lower when compared to the fourth intensity since a large portion of the signal was removed by the second filter 310.

In some examples, when comparing the third intensity received by the sensor 308 reflected from a relatively diffuse object 314 to the fifth intensity received by the sensor 308 reflected from a relatively reflective object 314, the two intensities are relatively similar. In examples, the intensities are relatively similar when a difference between the intensities is below a dynamic range threshold of the sensor 308.

In examples, where the first filter 306 includes a polarization filter imparting a first polarization on the signal emitted from the emitter 304, the first filter may include splitting the signal emitted from the emitter 304 into two polarized signals, for example, signals having orthogonal polarization. In examples, a first signal of signals having the orthogonal polarization may be rotated such that the first signal has a polarization similar to or parallel with a second signal of the signals. In examples the first signal and the second signal may be rejoined to form a polarized signal. In this example, an intensity of the rejoined signal may be greater that a signal where only a portion of the signal associated with a certain polarization is allowed to pass.

In examples, where the first filter 306 includes a polarization filter imparting a first polarization on the signal emitted from the emitter 304, the first filter may include splitting the signal emitted from the emitter 304 into two polarized signals, for example, signals having orthogonal polarization. In examples, a first signal of signals having the orthogonal polarization may be rotated to a third polarization angle between the orthogonal polarizations. In examples, a second signal of the signals may be rotated to the third polarization from the other of the orthogonal polarizations and rejoined with the first signal. In this example, an intensity of the rejoined signal may be greater that a signal where only a portion of the signal associated with a certain polarization is allowed to pass. In some examples, a slowing or shifting of a split signal caused by rotating the polarization is mitigated as both signals are subject to rotation of the polarization.

Additionally or alternatively, in examples, the emitter 304 may provide a polarized signal without the need for a first filter 306. For example, an emitter with a vertical cavity surface emitting laser (VCSEL) may be configured to emit a polarized signal directly. In this example, the first filter 306 may omitted. Additionally or alternatively the first filter 306 may be configured to rotate or diffuse the polarized signal from the emitter 304.

In examples, the signal emitted from the emitter 304 is unpolarized and the first filter 306 is either absent or does not impart a first polarization. In this example, the polarization of the second filter 310 may still bring a difference of intensities below the threshold. For example, the object 314 may be reflective or may be a retroreflector that reflects a signal with a polarization that is not aligned with the second filter 310.

In examples, the first filter 306 and/or the second filter 310 may be configured to change the first polarization and/or second polarization respectively. For example, the second filter 310 may be configured to allow a signal of a second polarization to pass at a first time and a signal of a third polarization to pass at a second time. In examples, the polarizations of the second filter 310 may be selected based at least in part on a first polarization associated with the first filter 306. For example, the second filter 310 may be configured to cause the second polarization to be orthogonal to the first polarization. In examples, the second filter 310 may be configured to cause the second polarization to be an angular offset of the first polarization. For examples, if the first polarization is set to 15 degrees, the second polarization may be set to be 20 degrees, 25 degrees, 45 degrees, 60 degrees, or a combination thereof. In examples, the second filter 310 may be configured to rotate between angular offsets. For example, the second filter 310 may be configured to allow a reading at an offset from the first polarization at every 5 degrees, at every 10 degrees, at every 15 degrees, at every 30 degrees, at every 45 degrees, or combinations or subsets thereof.

Additionally or alternatively, the first filter 306 and/or second filter 310 may be configured to activate, deactivate, and/or rotate. In examples, the first filter 306 and/or second filter 310 may be activated based on a determination in the system that a dynamic range of a sensor has been exceeded and/or exceeds a threshold. Additionally or alternatively, the first filter 306 and/or second filter 310 may be activated if a retroreflector is determined to be present or visible in the environment. Additionally or alternatively, the first filter 306 and/or second filter 310 may be rotated to a second angle if a retroreflector is determined to be present or visible in the environment, if a reflection from an object is determined to be present or visible in the environment, and/or if stray light is determined to be received by the sensor.

In examples, the first filter 306 and/or second filter 310 may be activated, deactivated, or rotated mechanically, electro-chemically, or applied through a digital process.

Figure 4:
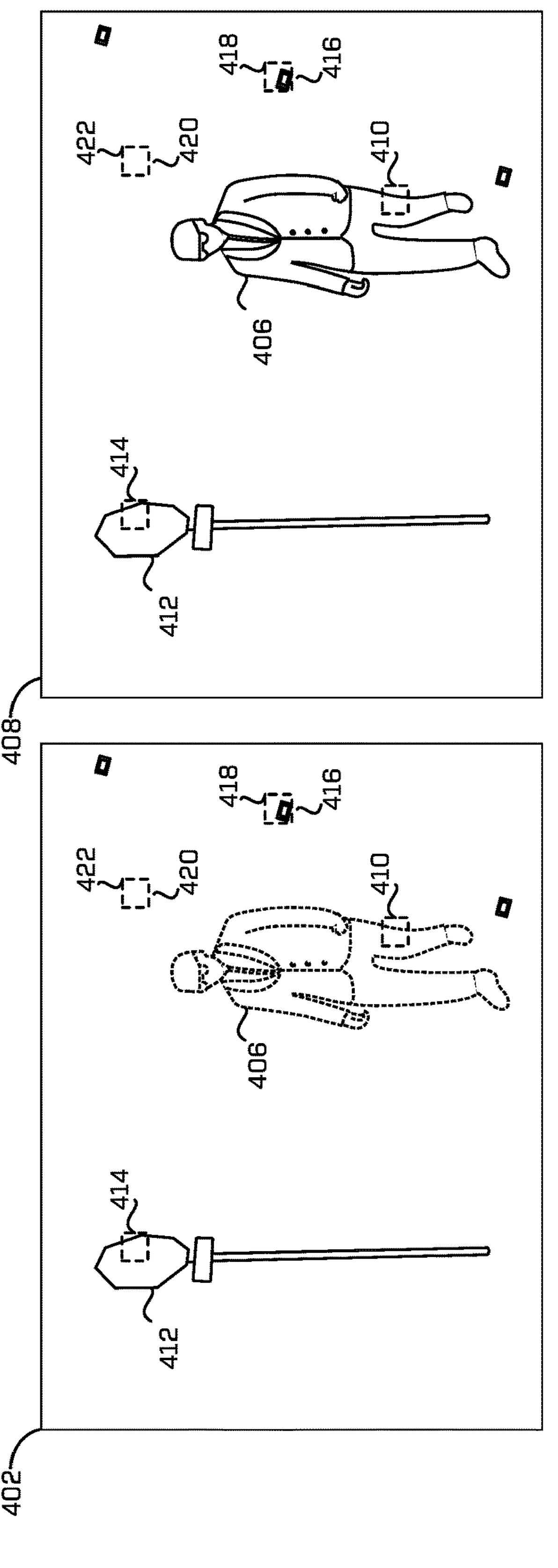
FIG. 4 illustrates example sensor data associated with an environment of a vehicle, in accordance with examples of the disclosure.

FIG. 4 illustrates example sensor data 400 associated with an environment of a vehicle, in accordance with examples of the disclosure. In some examples, the sensor data 400 includes an image frame 402 of a plurality of image frames associated with the sensor data 400. The image frame 402 includes data, e.g., data related to the depth information for each of a plurality of pixels. For example, as illustrated in FIG. 1, the image frame 402 includes a pixel 410 associated with depth data. The depth data can be associated with an object 406 in the environment. In this example, the depth data associated with the object 406 can be determined to be associated with the environment not including a retroreflector. The image frame 402 also includes a pixel 414 associated with depth data. The depth data can be associated with an object 412 in the environment. In this example, the depth data associated with the object 412 can be determined to be associated with the environment including a retroreflector. The image frame 402 also includes a pixel 418 associated with depth data. The depth data can be associated with an object 416 in the environment. In this example, the depth data associated with the object 416 can be determined to be associated with the environment including a retroreflector. The image frame 402 also includes a pixel 422 associated with depth data. The depth data can be associated with a portion of the image 420 of the environment. In this example, the depth data associated with the portion of the image 420 can be determined to be associated with the environment but not as a specified object. For example, the portion of the image 420 may be representative of background or unidentified portions of the environment.

In this example, the depth data may be associated with intensity data for the respective pixels. The difference in the intensities may determine the dynamic range of the captured image. In examples where the difference of the intensities causes the dynamic range of the image to exceed a threshold, portions of the image may be difficult, challenging, or impossible to identify. For example, if the difference in intensities exceeds the threshold, then, for example, it may be difficult for the system to determine an identity of the object 406. In some examples, the dynamic range of the image may great enough such that the pixel 410 that would otherwise be associated with object 406 is similar enough to pixel 422. In this example, the system may not be able to distinguish object 406 from the background of the image frame 408 as indicated by the broken lines of object 406.

In some examples, the system may determine that the dynamic range exceeds the threshold and may activate one or more filters to polarize the signals.

For example, the sensor data 300 may include an image frame 408 of the plurality of image frames associated with the sensor data 300 where a first filter and or second filter, for example, first filter 306 and second filter 310 are activated. In this example, the dynamic range of the image frame 408 is reduced below the threshold such that the object 406 is identifiable from the background of the image frame 408. In this example, the system may use the identification of the object 406 and control a vehicle accordingly.

Figure 5:
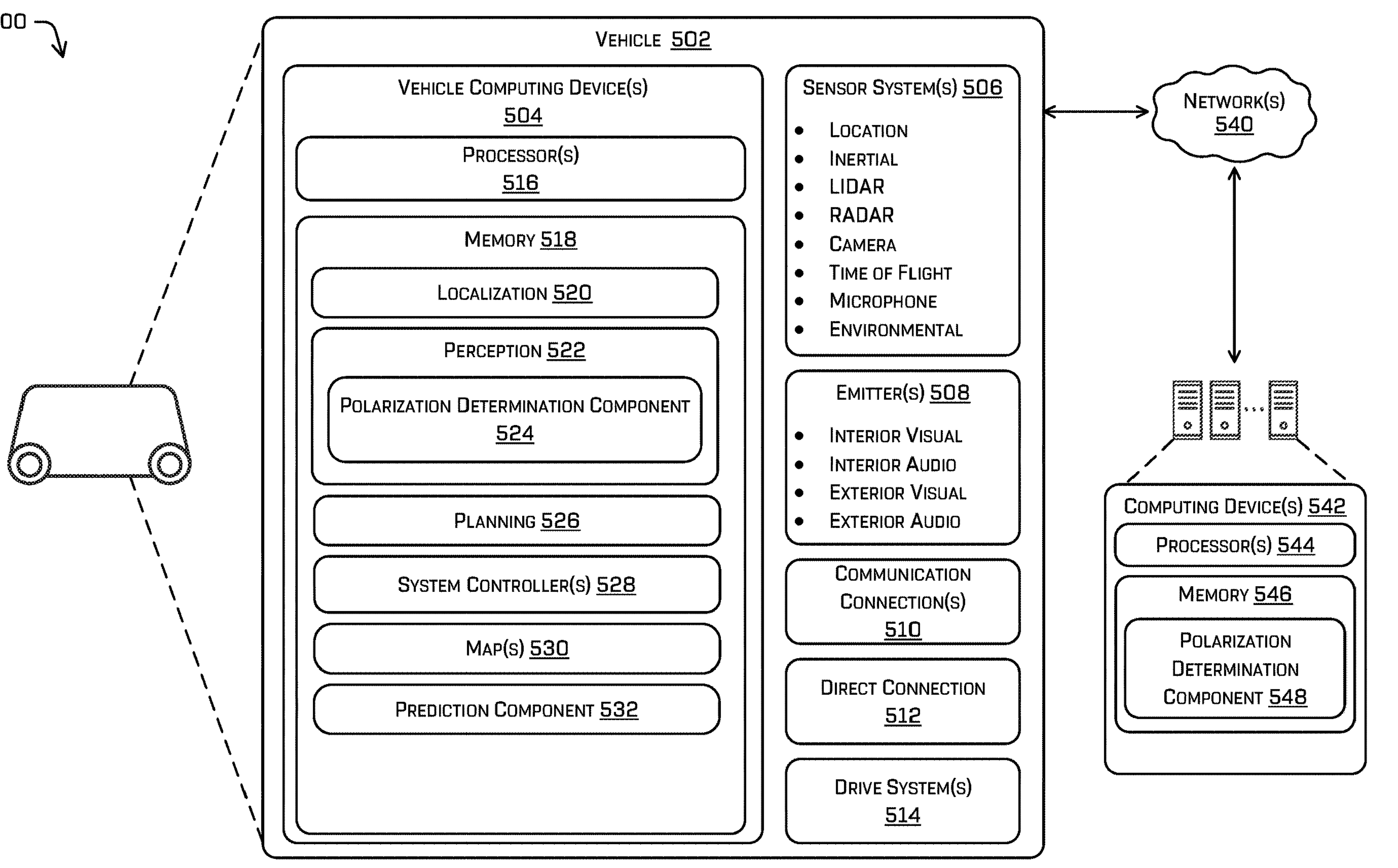
FIG. 5 depicts a block diagram of an example system for implementing the techniques described herein.

FIG. 5 depicts a block diagram of an example system 500 for implementing the techniques described herein. In at least one example, the system 500 can include a vehicle 502. The vehicle 502 can include a vehicle computing device 504, one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522 comprising a Polarization detection component 524, a planning component 526, one or more system controllers 528, one or more maps 530, and a prediction component 532. Though depicted in FIG. 4 as residing in memory 518 for illustrative purposes, it is contemplated that the localization component 520, the perception component 522, the polarization detection component 524, the planning component 526, the one or more system controllers 528, the one or more maps 530, and the prediction component 532 can additionally, or alternatively, be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some examples, the polarization detection component 524 can include functionality to determine whether received light associated with first sensor data based on a first emitter is different from received light associated with second sensor data based on a second emitter. In some examples, two captured images (e.g., an image associated with the first sensor data based on the emitter 110, and an image associated with the second sensor data based on the emitter 110, as described above in FIG. 1) can be determined to be determined to be associated with a retroreflector based on distance data associated with each image. By determining the two images are associated with a same distance data based on received light, the two images can be determined to be associated with an environment with no retroreflector. By determining the two images are associated with different distance data based on received light, the two images can be determined to be associated with an environment with a retroreflector.

In general, the planning component 526 can determine a path for the vehicle 502 to follow to traverse through an environment. For example, the planning component 526 can determine various routes and trajectories and various levels of detail. For example, the planning component 526 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 526 can generate an instruction for guiding the autonomous vehicle along at least a portion of the route from the first location to the second location. In at least one example, the planning component 526 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 528, which can be configured to control steering, propulsion, braking, safety, emitters, communication, and other systems of the vehicle 502. These system controller(s) 528 can communicate with and/or control corresponding systems of the drive system(s) 514 and/or other components of the vehicle 502.

The memory 518 can further include one or more maps 530 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 530 can include at least one map (e.g., images and/or a mesh). In some examples, the vehicle 502 can be controlled based at least in part on the maps 530. That is, the maps 530 can be used in connection with the localization component 520, the perception component 522, and/or the planning component 526 to determine a location of the vehicle 502, identify objects in an environment, and/or generate routes and/or trajectories to navigate within an environment.

In some examples, the one or more maps 530 can be stored on a remote computing device(s) (such as the computing device(s) 542) accessible via network(s) 540. In some examples, multiple maps 530 can be stored based on, for example, a characteristic (e.g., type of entity, time of day, day of week, season of the year, etc.). Storing multiple maps 530 can have similar memory requirements, but increase the speed at which data in a map can be accessed.

In general, the prediction component 532 can generate predicted trajectories of objects in an environment. For example, the prediction component 532 can generate one or more predicted trajectories for vehicles, pedestrians, animals, and the like within a threshold distance from the vehicle 502. In some instances, the prediction component 532 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 518 (and the memory 546, discussed below) can be implemented as a neural network.

As described herein, an exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 506 can include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the LIDAR sensors can include individual LIDAR sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device 504. Additionally or alternatively, the sensor system(s) 506 can send sensor data, via the one or more networks 540, to the one or more computing device(s) at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, RADAR sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, ahigh voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data to one or more computing device(s) 542 via the network(s) 540. In some examples, the vehicle 502 can send raw sensor data to the computing device(s) 542. In other examples, the vehicle 502 can send processed sensor data and/or representations of sensor data to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files.

The computing device(s) 542 can include processor(s) 544 and a memory 546 storing a polarization detection component 548. In some instances, the polarization detection component 548 can substantially correspond to the character determination component 224 and can include functionality to determine a difference between different distance data, and determine whether pixel(s) have been influenced by glare.

The processor(s) 516 of the vehicle 502 and the processor(s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

Example Clauses

A: A system comprising: one or more processors; and one or more non-transitory computer-readable media storing instructions executable by the one or more processors, wherein the instructions, when executed, cause the system to perform operations comprising: emitting, by an emitter of a time of flight sensor, a laser pulse into an environment, the laser pulse associated with a first polarization; generating, using a sensor of the time of flight sensor and based at least in part on reflected light associated with the laser pulse, sensor data, the reflected light associated with a second polarization; determining a distance associated with a pixel location of the sensor data; and controlling a vehicle based on the distance.

B: The system of paragraph A, further comprising: a first polarization filter in a transmit path of the emitter; and a second polarization filter in a receive path of the sensor, wherein emitting the laser pulse through the first polarization filter causes the laser pulse to be associated with the first polarization.

C: The system of paragraph A or B, wherein the operations further comprise: determining, based at least in part on the sensor data, a presence of a retroreflector in the environment; and controlling a vehicle based at least in part on the presence of the retroreflector.

D: The system of any of paragraphs A-C, the operations further comprising: determining a likelihood that at least a portion of the sensor data is indicative of a retroreflector in the environment; determining the likelihood meets or exceeds a threshold; and applying a polarization filter to a transmit path or a receive path based on determining that the likelihood meets or exceeds the threshold.

E: The system of any of paragraphs A-D, the operations further comprising: emitting, by the emitter of the time of flight sensor, a second laser pulse into the environment, the second laser pulse including a signal component associated with the second polarization; generating, using the sensor of the time of flight sensor and based at least in part on second reflected light associated with the second laser pulse, second sensor data, the second reflected light associated with a second polarization; determining, based at least in part on the sensor data and the second sensor data, an intensity difference associated with the pixel location; determining, based at least in part on the intensity difference, an object associated with the pixel location; and controlling the vehicle based on the object.

F: A method comprising: emitting a first signal via a transmit path of a depth sensor; receiving a second signal via a receive path, the second signal based at least in part on the first signal; activating a first polarization associated with the transmit path, based at least in part on the second signal; emitting a third signal via the transmit path, the third signal associated with a first polarization; receiving a fourth signal via the receive path, the fourth signal associated with a second polarization and based at least in part on the third signal; determining, based at least in part on the fourth signal, a distance associated with a pixel location; and controlling a vehicle based on the distance.

G: The method of paragraph F, wherein the first polarization is associated with a first polarizer in the transmit path, and the second polarization is associated with a second polarizer in the receive path.

H: The method of paragraph F or G, wherein the first polarizer is associated with a vertical cavity surface emitting laser, a light emitting diode, or combination thereof.

I: The method of any of paragraphs F-H, further comprising: determining, based at least in part on the fourth signal, a presence of a retroreflector in an environment; and controlling a vehicle based at least in part on the presence of the retroreflector.

J: The method of any of paragraphs F-I, further comprising: determining that at least a portion of the fourth signal is indicative a likelihood of a retroreflector in an environment; determining the likelihood meets or exceeds a threshold; and applying a polarization filter to a transmit path or a receive path based on determining that the likelihood meets or exceeds the threshold.

K: The method of any of paragraphs F-J, further comprising: emitting a fifth signal via the transmit path, the fifth signal associated with the first polarization; receiving a sixth signal via the receive path, the sixth signal associated with a third polarization and based at least in part on the fifth signal; determining, based at least in part on the third signal and the sixth signal, an intensity difference associated with the pixel location; determining, based at least in part on the intensity difference, an object associated with the pixel location.

L: The method of any of paragraphs F-K, wherein the depth sensor is one of a time of flight sensor or Light Detection and Ranging (LIDAR) sensor.

M: The method of any of paragraphs F-L, wherein the first polarization is orthogonal to the second polarization.

N: The method of any of paragraphs F-M, further comprising: receiving a fifth signal via a second receive path, the fifth signal associated with a third polarization and based at least in part on the third signal; determining, based at least in part on the fourth signal and the fifth signal, an intensity difference associated with the pixel location; and determining, based at least in part on the intensity difference, an object associated with the pixel location.

O: The method of any of paragraphs F-N, further comprising: receiving a fifth signal via a second receive path, the second signal based on the fifth signal, the fifth signal associated with a third polarization and based at least in part on the third signal; determining, based at least in part on the fourth signal and the fifth signal, a distance associated with the pixel location; and controlling the vehicle based on the distance.

P: The method of any of paragraphs F-O, further comprising: receiving a fifth signal via the receive path, the fifth signal associated with a third polarization and based at least in part on the third signal; and determining, based at least in part on the fourth signal and fifth signal, a surface normal associated with a surface associated with the pixel location.

Q: A system comprising: a time of flight sensor, comprising: an emitter configured to emit light via transmit path; a first polarization filter configured to, when engaged, selectively filter the light via the transmit path; a second polarization filter configured to, when engaged, selectively filter received light via a receive path; a sensor configured to receive light from an environment, the sensor associated with the receive path; and a controller configured to perform operations comprising: determining depth data based on the received light.

R: The system of paragraph Q, the operations further comprising: determining that a likelihood of a retroreflector in the environment meets or exceeds a threshold; and applying the first polarization filter to the transmit path or second polarization filter to the receive path based on determining that the likelihood meets or exceeds the threshold.

S: The system of paragraph Q or R, wherein: the time of flight sensor further comprises: a second orientation of the second polarization filter configured to filter the received light via the receive path; and the operations further comprise: determining, based on the filtered light, an intensity difference associated with the depth data; determining, based at least in part on the intensity difference, an object associated with the depth data; and controlling a vehicle based on the object.

T: The system of any of paragraphs Q-S, wherein the first polarization filter is orthogonal to a first orientation of the second polarization filter or the second orientation of the second polarization filter.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described.

The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
emitting a first signal via a transmit path of a depth sensor;
receiving a second signal via a receive path of the depth sensor, the second signal based at least in part on the first signal;
activating a first polarization associated with the transmit path, based at least in part on the second signal, wherein activating the first polarization comprises rotating a first polarizer associated with the transmit path;
emitting a third signal via the transmit path, the third signal associated with the first polarization;
receiving a fourth signal via the receive path, the fourth signal associated with a second polarization and based at least in part on the third signal, wherein a first polarization angle associated with the first polarization and a second polarization angle associated with the second polarization are dynamically adjustable;
determining, based at least in part on the fourth signal, a distance associated with a pixel location; and
controlling a vehicle based on the distance.

2. The method of claim 1, wherein one or more of the first polarization angle or the second polarization angle is dynamically adjusted based on a predetermined progression.

3. The method of claim 1, wherein the first polarizer is associated with a vertical cavity surface emitting laser, a light emitting diode, or combination thereof.

4. The method of claim 1, further comprising:
determining, based at least in part on the fourth signal, a presence of a retroreflector in an environment; and
controlling the vehicle further based at least in part on the presence of the retroreflector.

5. The method of claim 1, further comprising:
determining that at least a portion of the fourth signal is indicative of a likelihood of a retroreflector in an environment;
determining that the likelihood of the retroreflector in the environment meets or exceeds a threshold; and
applying a polarization filter to the transmit path or the receive path based on determining that the likelihood of the retroreflector in the environment meets or exceeds the threshold.

6. The method of claim 1, further comprising:
emitting a fifth signal via the transmit path, the fifth signal associated with the first polarization;
receiving a sixth signal via the receive path, the sixth signal associated with a third polarization and based at least in part on the fifth signal;
determining, based at least in part on the third signal and the sixth signal, an intensity difference associated with the pixel location; and
determining, based at least in part on the intensity difference, an object associated with the pixel location.

7. The method of claim 1, wherein the depth sensor is one of a time of flight sensor or Light Detection and Ranging (LIDAR) sensor.

8. The method of claim 1, wherein controlling the vehicle based on the distance comprises activating a vehicle operation mode.

9. The method of claim 1, further comprising:
receiving a fifth signal via a second receive path, the fifth signal associated with a third polarization and based at least in part on the third signal;
determining, based at least in part on the fourth signal and the fifth signal, an intensity difference associated with the pixel location; and
determining, based at least in part on the intensity difference, an object associated with the pixel location.

10. The method of claim 1, further comprising:
receiving a fifth signal via a second receive path of the depth sensor, the second signal based on the fifth signal, the fifth signal associated with a third polarization and based at least in part on the third signal;
determining, based at least in part on the fourth signal and the fifth signal, the distance associated with the pixel location; and
controlling the vehicle based on the distance.

11. The method of claim 1, further comprising:
receiving a fifth signal via the receive path, the fifth signal associated with a third polarization and based at least in part on the third signal; and
determining, based at least in part on the fourth signal and the fifth signal, a surface normal associated with a surface associated with the pixel location.

12. A system comprising:
one or more processors; and
one or more non-transitory computer-readable media storing instructions executable by the one or more processors, wherein the instructions, when executed, cause the system to perform operations comprising:
emitting a first signal via a transmit path of a depth sensor;
receiving a second signal via a receive path, the second signal based at least in part on the first signal;
activating a first polarization associated with the transmit path, based at least in part on the second signal, wherein activating the first polarization comprises rotating a first polarizer associated with the transmit path;
emitting a third signal via the transmit path, the third signal associated with the first polarization;
receiving a fourth signal via the receive path, the fourth signal associated with a second polarization and based at least in part on the third signal, wherein a first polarization angle associated with the first polarization and a second polarization angle associated with the second polarization are dynamically adjustable;
determining, based at least in part on the fourth signal, a distance associated with a pixel location; and
controlling a vehicle based on the distance.

13. The system of claim 12, wherein the second polarization is associated with a second polarizer in the receive path.

14. The system of claim 12, wherein the first polarizer is associated with a vertical cavity surface emitting laser, a light emitting diode, or a combination thereof.

15. The system of claim 12, the operations further comprising:
determining, based at least in part on the fourth signal, a presence of a retroreflector in an environment; and
controlling the vehicle based at least in part on the presence of the retroreflector.

16. The system of claim 12, wherein the depth sensor is one of a time of flight sensor or a Light Detection and Ranging (LIDAR) sensor.

17. One or more non-transitory computer-readable media storing instructions that, when executed by one or more processors, cause the one or more processors to perform operations comprising:

emitting a first signal via a transmit path of a depth sensor;

receiving a second signal via a receive path, the second signal based at least in part on the first signal;

activating a first polarization associated with the transmit path, based at least in part on the second signal, wherein activating the first polarization comprises rotating a first polarizer associated with the transmit path;

emitting a third signal via the transmit path, the third signal associated with the first polarization;

receiving a fourth signal via the receive path, the fourth signal associated with a second polarization and based at least in part on the third signal, wherein a first polarization angle associated with the first polarization and a second polarization angle associated with the second polarization are dynamically adjustable;

determining, based at least in part on the fourth signal, a distance associated with a pixel location; and controlling a vehicle based on the distance.

18. The one or more non-transitory computer-readable media of claim 17, wherein the second polarization is associated with a second polarizer in the receive path.

19. The one or more non-transitory computer-readable media of claim 17, wherein the first polarizer is associated with a vertical cavity surface emitting laser, a light emitting diode, or a combination thereof.

20. The one or more non-transitory computer-readable media of claim 17, the operations further comprising:

determining, based at least in part on the fourth signal, a presence of a retroreflector in an environment; and controlling the vehicle based at least in part on the presence of the retroreflector.

* * * * *